US010640624B2

(12) United States Patent
Lee

(10) Patent No.: US 10,640,624 B2
(45) Date of Patent: May 5, 2020

(54) THERMOPLASTIC RESIN COMPOSITION AND ARTICLE USING THE SAME

(71) Applicant: Lotte Advanced Materials Co., Ltd., Yeosu-si (KR)

(72) Inventor: Woo Jin Lee, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 53 days.

(21) Appl. No.: 15/838,558

(22) Filed: Dec. 12, 2017

(65) Prior Publication Data
US 2018/0179360 A1  Jun. 28, 2018

(30) Foreign Application Priority Data
Dec. 22, 2016 (KR) .................. 10-2016-0176925

(51) Int. Cl.
C08K 5/00 (2006.01)
C08K 3/22 (2006.01)
C08L 69/00 (2006.01)
C08K 5/521 (2006.01)
C08K 3/34 (2006.01)

(52) U.S. Cl.
CPC .............. C08K 5/0066 (2013.01); C08K 3/22 (2013.01); C08L 69/00 (2013.01); C08J 2300/22 (2013.01); C08K 5/005 (2013.01); C08K 5/0016 (2013.01); C08K 5/521 (2013.01); C08K 2003/2227 (2013.01); C08L 2201/02 (2013.01); C08L 2201/08 (2013.01)

(58) Field of Classification Search
CPC ...... C08K 5/0066; C08K 3/22; C08K 5/0016; C08K 5/005; C08K 5/521; C08K 2003/2227; C08L 69/00; C08L 2201/02; C08L 2201/08; C08J 2300/22
See application file for complete search history.

(56) References Cited

U.S. PATENT DOCUMENTS

| 4,692,488 | A | 9/1987 | Kress et al. |
| 5,061,745 | A | 10/1991 | Wittmann et al. |
| 5,204,394 | A | 4/1993 | Gosens et al. |
| 5,672,645 | A | 9/1997 | Eckel et al. |
| 5,849,827 | A | 12/1998 | Bodiger et al. |
| 7,067,567 | B2 | 6/2006 | Seidel et al. |
| 7,220,790 | B2 | 5/2007 | Seidel et al. |
| 7,259,200 | B2 | 8/2007 | Bauer et al. |
| 7,833,448 | B2 | 11/2010 | Bucholz et al. |
| 7,834,075 | B2 | 11/2010 | Bucholz et al. |
| 7,893,141 | B2 | 2/2011 | Wit et al. |
| 8,557,899 | B2 | 10/2013 | Yamaguchi et al. |
| 8,691,902 | B2* | 4/2014 | Grcev ..................... C08J 5/18 524/261 |
| 8,748,521 | B2 | 6/2014 | Taschner et al. |
| 8,841,373 | B2 | 9/2014 | Ewald et al. |
| 2007/0225441 | A1 | 9/2007 | Wenz et al. |
| 2009/0239991 | A1 | 9/2009 | Avtomonov et al. |
| 2012/0025126 | A1* | 2/2012 | Vo ..................... C08J 9/0066 252/62 |
| 2013/0217814 | A1 | 8/2013 | Yu |
| 2014/0155548 | A1 | 6/2014 | Kurokawa et al. |
| 2015/0183986 | A1 | 7/2015 | Kim et al. |
| 2015/0315383 | A1 | 11/2015 | Avtomonov et al. |

FOREIGN PATENT DOCUMENTS

| CN | 102464881 A | 5/2012 |
| CN | 102731984 A | 10/2012 |
| CN | 104744914 A | 7/2015 |
| EP | 0640655 B1 | 3/1995 |
| JP | 59-202240 A | 11/1984 |
| JP | 11-140295 A | 5/1999 |
| JP | 2009-530456 A | 8/2009 |
| JP | 4469167 A | 5/2010 |
| JP | 5717378 B2 | 5/2012 |
| JP | 5043295 B | 10/2012 |
| JP | 5100743 B | 10/2012 |
| JP | 2012-531514 A | 12/2012 |
| JP | 5900499 B2 | 4/2016 |
| KR | 10-0957883 B1 | 4/2005 |
| KR | 10-2010-0125344 A | 11/2010 |
| KR | 10-2011-0100630 A | 9/2011 |
| KR | 10-2012-0065711 | 6/2012 |
| KR | 10-1351735 B1 | 1/2014 |
| KR | 10-1370193 B1 | 3/2014 |
| KR | 10-2015-0106053 A | 9/2015 |
| TW | 201030068 A | 8/2010 |
| WO | 2010/075087 A1 | 7/2010 |

OTHER PUBLICATIONS

Office Action in counterpart Chinese Application No. 201711381704.8 dated Sep. 4, 2019, pp. 1-6.
English-translation of Office Action in counterpart Chinese Application No. 201711381704.8 dated Sep. 4, 2019, pp. 1-8.

* cited by examiner

Primary Examiner — Andrew J. Oyer
(74) Attorney, Agent, or Firm — Additon, Higgins & Pendleton, P.A.

(57) ABSTRACT

Disclosed are a thermoplastic resin composition including (A) a polycarbonate resin; (B) an impact-reinforcing agent; (C) an anti-drip agent; (D) a phosphorus-based flame retardant; (E) an inorganic filler; and (F) boehmite, wherein the phosphorus-based flame retardant and the boehmite are included in a weight ratio of about 14:1 to about 15:1 and an article formed therefrom.

13 Claims, No Drawings

THERMOPLASTIC RESIN COMPOSITION AND ARTICLE USING THE SAME

CROSS-REFERENCE TO RELATED APPLICATION

This application claims priority to and the benefit of Korean Patent Application No. 10-2016-0176925 filed in the Korean Intellectual Property Office on Dec. 22, 2016, the entire disclosure of which is incorporated herein by reference.

FIELD

A thermoplastic resin composition and an article using the same are disclosed.

BACKGROUND OF THE INVENTION

Generally, a resin composition employed for a large injection molded article radiating lots of heat such as a computer housing or other office devices necessarily maintains flame retardancy and heat resistance and high mechanical strength. In order to provide the resin composition with flame retardancy, conventionally, a halogen-based flame retardant and an antimony compound have been used. However, since combustion gases generated by using the halogen-based flame retardant are hazardous for a human body, there is a need for a resin composition including halogen-free flame retardant.

The commonly-used method for providing flame retardancy without using the halogen-based retardant is to employ a phosphate ester-based flame retardant. U.S. Pat. No. 4,692,488 discloses a halogen-free phosphorus-based compound, and U.S. Pat. No. 5,061,745 discloses a monomer-type phosphate ester. A resin composition, however, can exhibit a "juicing" phenomenon wherein a flame retardant of a monomer-type phosphate ester compound is transported onto a surface of the article and precipitated during the molding process.

An oligomer-type phosphate ester compound is also known to be used as a flame retardant, and a method of preparing the compound is disclosed in Japanese Patent Laid-Open Publication No. 59-202,240. In addition, the compound may be used as the flame retardant of a polyamide or polycarbonate resin. U.S. Pat. No. 5,204,394 discloses a flame retardant resin composition including an aromatic polycarbonate resin, a styrene-containing copolymer or a graft copolymer, and a phosphate ester oligomer.

Using an oligomer-type phosphate ester flame retardant with a thermoplastic resin can reduce the juicing phenomenon and relatively improve heat resistance compared to a monomer-type phosphate ester. An oligomer-type phosphate ester flame retardant, however, can have reduced flame retardancy as compared to a monomer-type phosphate ester-based flame retardant having the same weight. Thus higher amounts of the oligomer-type phosphate ester flame retardant may be required to ensure comparable flame retardancy. This, however, can significantly deteriorate mechanical strength of the resin composition.

European Patent No. 640,655 discloses a PC/ABS resin composition including a mixture of an aromatic polycarbonate resin, a vinyl-based copolymer, a graft copolymer, a monomer-type phosphate ester, an oligomer-type phosphate ester and a fluorinated polyolefin. The composition, however, can exhibit the juicing phenomenon of transporting a monomer-type phosphate ester onto a surface of an article during the molding process, the heat resistance can be deteriorated, and the flame retardancy can be deteriorated when using an excessive amount of the oligomer-type phosphate ester.

Thus, the present inventors have developed a flame retardant thermoplastic resin composition that can have excellent flame retardancy, heat resistance and mechanical strength and also can have excellent property balance of impact resistance, thermal stability, workability, and appearance characteristics, and the like, in order to solve the problems.

SUMMARY OF THE INVENTION

An embodiment provides a thermoplastic resin composition that can have improved flame retardancy and simultaneously excellent heat resistance and impact strength.

A thermoplastic resin composition according to an embodiment includes (A) a polycarbonate resin; (B) an impact-reinforcing agent; (C) an anti-drip agent; (D) a phosphorus-based flame retardant; (E) an inorganic filler; and (F) boehmite, wherein the phosphorus-based flame retardant and the boehmite are included in a weight ratio of about 14:1 to about 15:1.

The polycarbonate resin may have a weight average molecular weight of about 10,000 g/mol to about 200,000 g/mol.

The impact-reinforcing agent may include a rubber modified vinyl-based copolymer.

The rubber modified vinyl-based copolymer may include an ethylene-methylacrylate copolymer (EMA), an ethylene-ethyl acrylate copolymer (EEA), methylmethacrylate-butadiene-styrene (MBS), styrene-butadiene-styrene (SBS), a styrene-butadiene rubber (SBR), an ethylene-propylene rubber (EPM, EPR), an ethylene-propylene-diene copolymer (EPDM), a maleic anhydride modified EPM (EPM-g-MA), maleic anhydride modified SBS (SBS-g-MA), maleic anhydride modified EPDM (EPDM-g-MA), and/or an ethylene vinyl alcohol copolymer (EVOH).

The anti-drip agent may include a fluorinated olefin-based resin.

The phosphorus-based flame retardant may be represented by Chemical Formula 1:

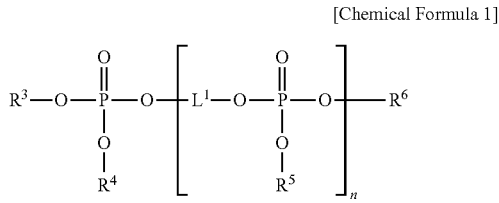

[Chemical Formula 1]

wherein, in Chemical Formula 1, $R^3$ to $R^6$ are the same or different and are each independently a substituted or unsubstituted C1 to C20 alkyl group or a substituted or unsubstituted C6 to C20 aryl group, each $L^1$ is independently a substituted or unsubstituted C1 to C20 alkylene group or a substituted or unsubstituted C6 to C20 arylene group, and n is an integer ranging from 0 to 3.

$R^3$ to $R^6$ may each independently be an unsubstituted phenyl group and/or a phenyl group substituted with a methyl group, an ethyl group, an isopropyl group, a t-butyl group, an isobutyl group, an isoamyl group, and/or a t-amyl group.

The inorganic filler may be a sheet-shaped filler.

The sheet-shaped filler may be talc, mica, or a mixture thereof.

The sheet-shaped filler may have an average thickness of about 30 nm to about 700 nm, an average particle size of about 0.65 μm to about 5.0 μm, and a ratio (diameter/thickness) of an average diameter and an average thickness of about 4 to about 30.

The thermoplastic resin composition may include about 50 wt % to about 80 wt % of (A) the polycarbonate resin; about 10 wt % to about 15 wt % of (B) the impact-reinforcing agent; about 0.1 wt % to about 3 wt % of (C) the anti-drip agent; about 1.4 wt % to about 30 wt % of (D) the phosphorus-based flame retardant; about 0.1 wt % to about 3 wt % of (E) the inorganic filler; and about 0.1 wt % to about 2 wt % of (F) the boehmite, each based on a total amount (total weight, 100 wt %) of (A)+(B)+(C)+(D)+(E)+(F) of the thermoplastic resin composition.

The thermoplastic resin composition may further include at least one of a release agent, a lubricant, a plasticizer, a heat stabilizer, a light stabilizer, a pigment, and/or a dye.

Another embodiment provides an article formed from the thermoplastic resin composition.

The present invention provides a thermoplastic resin composition that can have improved flame retardancy and simultaneously improved heat resistance and impact resistance.

DETAILED DESCRIPTION

The present invention will be described more fully hereinafter with reference to the accompanying drawing, in which exemplary embodiments of the present invention are shown. This invention may, however, be embodied in many different forms and should not be construed as limited to the exemplary embodiments set forth herein. These exemplary embodiments disclosed in this specification are provided so that this disclosure will satisfy applicable legal requirements.

As used herein, when a definition is not otherwise provided, "substituted" may refer to replacement of at least one hydrogen of a compound with one or more of a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group; a C1 to C10 trifluoroalkyl group such as a trifluoromethyl group; and/or a cyano group.

As used herein, when a definition is not otherwise provided, "hetero" may refer to 1 to 3 heteroatoms selected from N, O, S, and/or P in place of at least one carbon atom of a compound and/or a substituent.

As used herein, when a definition is not otherwise provided, the term "alkyl group" may refer to a "saturated alkyl group" without an alkene group or an alkyne group; or an "unsaturated alkyl group" including at least one of an alkene group and an alkyne group. The term "alkene group" may refer to a substituent in which at least two carbon atoms are bound with at least one carbon-carbon double bond, and the term "alkynyl group" may refer to a substituent in which at least two carbon atoms are bound with at least one carbon-carbon triple bond. The alkyl group may be a branched, linear, and/or cyclic alkyl group.

The alkyl group may be a C1 to C20 alkyl group, for example a C1 to C6 lower alkyl group, a C7 to C10 middle alkyl group, and/or a C11 to C20 higher alkyl group.

The term "aromatic" may refer to a compound including a cyclic structure where all elements have p-orbitals which form conjugation. Examples thereof may include an aryl group and/or a heteroaryl group.

The term "aryl group" may refer to a monocyclic and/or fused ring-containing polycyclic (i.e., rings sharing adjacent pairs of carbon atoms) groups.

The term "heteroaryl group" may refer to an aryl group including 1 to 3 heteroatoms selected from N, O, S, and/or P in place of at least one carbon atom. When the heteroaryl group is a fused ring, each ring may include 1 to 3 heteroatoms.

As used herein, when a specific definition is not otherwise provided, the term (meth)acrylate refers to acrylate and/or methacrylate. In addition, the term (meth)acrylic acid alkyl ester refers to an acrylic acid alkyl ester and/or a methacrylic acid alkyl ester and the term (meth)acrylic acid ester refers to an acrylic acid ester and/or a methacrylic acid ester.

As used herein, when a definition is not otherwise provided, the term "copolymerization" may refer to block copolymerization, random copolymerization, graft copolymerization, and/or alternate copolymerization and the term "a copolymer" may refer to a block copolymer, a random copolymer, a graft copolymer, and/or an alternate copolymer.

A thermoplastic resin composition that can have improved flame retardancy, heat resistance, and/or impact resistance according to an embodiment includes (A) a polycarbonate resin; (B) an impact-reinforcing agent; (C) an anti-drip agent; (D) a phosphorus-based flame retardant; (E) an inorganic filler; and (F) boehmite.

The phosphorus-based flame retardant and the boehmite are included at a weight ratio of about 14:1 to about 15:1. Thus, it may provide a thermoplastic resin composition having excellent flame retardancy and improving heat resistance and impact resistance at the same time without exhibiting the juicing phenomenon, by including the phosphorus-based flame retardant and the boehmite within the weight range.

Hereinafter, the present disclosure is described in detail.

(A) Polycarbonate Resin

In exemplary embodiments, the (A) thermoplastic polycarbonate resin that is a component used for preparing thermoplastic resin composition is an aromatic polycarbonate resin prepared by reacting one or more diphenols represented by Chemical Formula 2 with phosgene, halogen formate, and/or carbonate diester:

[Chemical Formula 2]

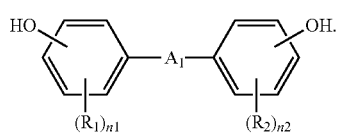

In Chemical Formula 2, $A_1$ is selected from a single bond, a substituted or unsubstituted C1 to C5 alkylene group, a substituted or unsubstituted C1 to C5 alkylidene group, a substituted or unsubstituted C3 to C6 cycloalkylene group, a substituted or unsubstituted C5 to C6 cycloalkylidene group, CO, S, and $SO_2$, $R_1$ and $R_2$ are the same or different and are each independently a substituted or unsubstituted C1 to C30 alkyl group or a substituted or unsubstituted C6 to C30 aryl group, and $n_1$ and $n_2$ are the same or different and are each independently an integer ranging from 0 to 4.

The term "substituted" refers to replacement of hydrogen by a substituent selected from a halogen, a C1 to C30 alkyl group, a C1 to C30 haloalkyl group, a C6 to C30 aryl group, a C2 to C30 heteroaryl group, a C1 to C20 alkoxy group, and a combination thereof.

Examples of the diphenol may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. For example, 2,2-bis-(4hydroxyphenyl)-propane, 2,2-bis-(3,5-dichloro-4-hydroxyphenyl)-propane, and/or 1,1-bis-(4-hydroxyphenyl)-cyclohexane, for example, 2,2-bis-(4-hydroxyphenyl)-propane (also referred to as bisphenol-A) may be used.

The polycarbonate resin may have a weight average molecular weight (Mw) of about 10,000 g/mol to about 200,000 g/mol, for example, about 15,000 g/mol to about 80,000 g/mol, but is not limited thereto.

The polycarbonate resin may include a copolymer and/or a mixture of copolymers prepared from two or more kinds of diphenols. In addition, the polycarbonate resin may include a linear polycarbonate resin, a branched polycarbonate resin, a polyester carbonate copolymer resin, and the like, and mixtures thereof.

The linear polycarbonate resin may be a bisphenol-A-based polycarbonate resin.

The branched polycarbonate resin may be prepared by reacting a multi-functional compound having at least three functionality, for example a compound having trivalent or more phenolic groups, such as a multi-functional aromatic compound such as trimellitic anhydride, trimellitic acid, and the like, with diphenol(s) and a carbonate. The multi-functional aromatic compound may be included in an amount of about 0.05 mol % to about 2.0 mol % based on a total amount of branched polycarbonate resin.

The polyester carbonate copolymer resin may be prepared by reacting bifunctional carboxylic acid with diphenol(s) and carbonate. The carbonate may be diaryl carbonate such as diphenyl carbonate and/or ethylene carbonate.

The polycarbonate resin may include homo-polycarbonate resin, co-polycarbonate resin, and/or a blend of co-polycarbonate resin(s) and/or homo-polycarbonate resin(s).

The thermoplastic resin composition may include the polycarbonate resin in an amount of about 50 wt % to about 80 wt %, for example about 60 wt % to about 75 wt %, based on the total weight (100 wt %) of (A)+(B)+(C)+(D)+(E)+(F) of the thermoplastic resin. In some embodiments, the thermoplastic resin composition may include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the polycarbonate resin may be in a range from about any of the foregoing amounts to about any other of the foregoing amounts.

(B) Impact-reinforcing Agent

The (B) impact-reinforcing agent that is a component used for preparing thermoplastic resin composition may include a rubber modified vinyl-based copolymer. For example, the rubber modified vinyl-based copolymer may be a rubber modified vinyl-based graft copolymer resin.

The rubber modified vinyl-based graft copolymer may be a rubber modified vinyl-based graft copolymer obtained by graft polymerization of about 5 wt % to about 95 wt % of (b1) a monomer mixture including about 40 wt % to about 95 wt % of a first monomer including styrene, α-methylstyrene, halogen and/or alkyl substituted styrene, C1 to C8 methacrylic acid alkyl esters, C1 to C8 acrylic acid alkyl esters, and/or a mixture thereof and about 5 wt % to about 60 wt % of a second monomer including acrylonitrile, methacrylonitrile, C1 to C8 methacrylic acid alkyl esters, C1 to C8 acrylic acid alkyl esters, maleic anhydride, C1 to C4 alkyl and/or phenyl N-substituted maleimide, and/or a mixture thereof, into about 5 wt % to about 95 wt % of (b2) a rubber polymer such as but not limited to a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM), a polyorganosiloxane/polyalkyl(meth)acrylate rubber composite, and mixtures thereof.

In some embodiments, the rubber modified vinyl-based graft copolymer may include the monomer mixture in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the monomer mixture may be in a range from about any of the foregoing amounts to about any other of the foregoing amounts.

In some embodiments, the monomer mixture may include the first monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the first monomer may be in a range from about any of the foregoing amounts to about any other of the foregoing amounts.

In some embodiments, the monomer mixture may include the second monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the second monomer may be in a range from about any of the foregoing amounts to about any other of the foregoing amounts.

In some embodiments, the rubber modified vinyl-based graft copolymer may include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the rubber polymer may be in a range from about any of the foregoing amounts to about any other of the foregoing amounts.

The C1 to C8 methacrylic acid alkyl esters or the 01 to C8 acrylic acid alkyl esters are esters of methacrylic acid or acrylic acid, respectively, and are esters obtained from monohydryl alcohol having one to eight carbon atoms. Examples thereof may include without limitation a methacrylic acid methyl ester, a methacrylic acid ethyl ester, an acrylic acid ethyl ester, a methacrylic acid propyl ester, and the like, and mixtures thereof, for example, methacrylic acid methyl ester.

Examples of the rubber modified vinyl-based graft copolymer may include without limitation a graft-copolymer including a mixture of styrene, acrylonitrile, and optionally a (meth)acrylic acid alkyl ester monomer graft-copolymerized into a butadiene rubber, an acrylic rubber, and/or a styrene/butadiene rubber; a graft-copolymer including a mixture of a (meth)acrylic acid methyl ester monomer graft-copolymerized into a butadiene rubber, an acrylic rubber, and/or a styrene/butadiene rubber; and the like, and mixtures thereof.

Other examples of the rubber modified vinyl-based copolymer may include without limitation an ethylene-methylacrylate copolymer (EMA), an ethylene-ethylacrylate copolymer (EEA), methylmethacrylate-butadiene-styrene (MBS), styrene-butadiene-styrene (SBS), styrene-butadiene rubber (SBR), an ethylene-propylene rubber (EPM, EPR), an ethylene-propylene-diene copolymer (EPDM), maleic anhydride modified EPM (EPM-g-MA), maleic anhydride modified SBS (SBS-g-MA), maleic anhydride modified EPDM (EPDM-g-MA), an ethylene vinyl alcohol copolymer (EVOH), and the like, and mixtures thereof, for example, MBS copolymer.

The rubber polymer can have an average particle size ranging from about 0.05 μm to about 4 μm to improve impart strength and/or surface characteristics of the article.

Methods of preparing the graft copolymer are well known to a person of ordinary skill in the art, and examples of the method may include without limitation any one of emulsion polymerization, suspension polymerization, solution polymerization, and/or mass polymerization. For example, the method can include emulsion polymerization and/or mass polymerization using a polymerization initiator of the above aromatic vinyl-based monomer(s) and rubbery polymer.

The thermoplastic resin composition may include the impact-reinforcing agent in an amount of about 10 wt % to about 15 wt %, for example about 11 wt % to about 14 wt %, based on the total weight (100 wt %) of (A)+(B)+(C)+(D)+(E)+(F) of the thermoplastic resin. In some embodiments, the thermoplastic resin composition may include the impact-reinforcing agent in an amount of about 10, 11, 12, 13, 14, or 15 wt %. Further, according to some embodiments, the amount of the impact-reinforcing agent may be in a range from about any of the foregoing amounts to about any other of the foregoing amounts.

(C) Anti-drip Agent

The (C) anti-drip agent that is a component used for preparing thermoplastic resin composition may include a fluorinated olefin-based resin.

Examples of the fluorinated olefin-based resin may include without limitation a polytetrafluoroethylene resin, a polyfluoroethylene resin, a polyfluoropropylene resin, a polyfluorobutylene resin, a polyvinylidene fluoride, a tetrafluoroethylene/vinylidene fluoride copolymer, a tetrafluoroethylene/hexafluoropropylene copolymer, an ethylene/tetrafluoroethylene copolymer, and the like. These may be used alone or in mixtures of at least two or more.

The thermoplastic resin composition may include the anti-drip agent in an amount of about 0.1 wt % to about 3 wt %, for example about 0.5 wt % to about 2 wt %, based on the total weight (100 wt %) of (A)+(B)+(C)+(D)+(E)+(F) of the thermoplastic resin. In some embodiments, the thermoplastic resin composition may include the anti-drip agent in an amount of about 0.1, 0.2, 0.3, 0.4, 0.5, 0.6, 0.7, 0.8, 0.9, 1, 2, or 3 wt %. Further, according to some embodiments, the amount of the anti-drip agent may be in a range from about any of the foregoing amounts to about any other of the foregoing amounts.

(D) Phosphorus-based Flame Retardant

The thermoplastic resin composition includes the (D) phosphorus-based flame retardant.

The phosphorus-based flame retardant generally refers to a phosphorus-containing flame retardant. Examples of the phosphorus-based flame retardant may include without limitation phosphates, phosphonates, phosphinates, phosphine oxides, phosphazenes, metal salts thereof, and the like, and mixtures thereof.

For example, the phosphorus-based flame retardant may be represented by Chemical Formula 1:

[Chemical Formula 1]

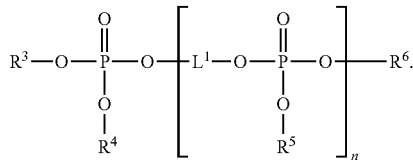

In Chemical Formula 1, $R^1$ to $R^4$ are the same or different and are each independently a substituted or unsubstituted C1 to C20 alkyl group or a substituted or unsubstituted C6 to C20 aryl group, each $L^1$ is independently a substituted or unsubstituted C1 to C20 alkylene group or a substituted or unsubstituted C6 to C20 arylene group, and n is an integer ranging from 0 to 3.

$R^1$ to $R^4$ may each independently be an unsubstituted phenyl group and/or a phenyl group substituted with a methyl group, an ethyl group, an isopropyl group, a t-butyl group, an isobutyl group, an isoamyl group, and/or a t-amyl group.

Examples of the compound represented by Chemical Formula 1 may include without limitation a tributyl phosphate salt, triphenyl phosphate, diphenyl octyl phosphate, tri(isopropyl phenyl) phosphate, resorcinol cross-linked diphosphate, and/or bisphenol A cross-linked diphosphate. In exemplary embodiments, an oligomer phosphate ester represented by Chemical Formula 1 derived from bisphenol A may be used.

In exemplary embodiments, the phosphorus-based flame retardant may include a phosphate ester compound used as singly or as a mixture of phosphate ester compounds in which n is 0, 1, 2 and/or 3 in Chemical Formula 1, wherein the mixture of phosphate ester compounds may be preliminarily mixed during a polymerization process and/or may be a mixture of the phosphate ester compounds having different n's from each other which are separately prepared.

The thermoplastic resin composition may include the phosphorus-based flame retardant in an amount of about 1.4 wt % to about 30 wt % based on the total weight (100 wt %) of (A)+(B)+(C)+(D)+(E)+(F) of the thermoplastic resin. In some embodiments, the thermoplastic resin composition may include the phosphorus-based flame retardant in an amount of about 1.4, 1.5, 1.6, 1.7, 1.8, 1.9, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments, the amount of the phosphorus-based flame retardant may be in a range from about any of the foregoing amounts to about any other of the foregoing amounts.

(E) Inorganic Filler

The (E) inorganic filler that is a component used for preparing thermoplastic resin composition may be a sheet-shaped filler.

The sheet-shaped filler may be talc, mica, or a mixture thereof, for example, talc, but is not limited thereto.

In an embodiment, the sheet-shaped filler can have a thin film shape wherein a Z-axis thereof has a smaller length (thickness) than a cross-section area illustrated by lengths of a X-axis and a Y-axis; and an average thickness (length of Z-axis) thereof may be about 30 nm to about 700 nm, for example, about 30 nm to about 300 nm, a ratio (aspect ratio, diameter/thickness) of an average diameter (average length of X-axis, Y-axis) and an average thickness (length of Z-axis) may be about 4 to about 30, for example, about 10 to about 30. The strength improvement effect may be more increased as the ratio of the average diameter and the average thickness increases. In addition, the sheet-shaped filler may have an average particle size of about 0.65 μm to about 5.0 μm, for example, about 0.65 μm to about 2.7 μm, and as another example, about 0.8 μm to about 2.5 μm. The average particle size of the sheet-shaped filler means a median value of the particle size distribution measured by a X-ray transmission as known in the art and understood by the skilled artisan. Specifically, the average particle size may be obtained by transmitting a X-ray through the precipitating particles to provide a particle size distribution of the sheet-shaped filler and calculating the median value thereof.

The thermoplastic resin composition may include the inorganic filler in an amount of about 0.1 wt % to about 3 wt % based on the total weight (100 wt %) of (A)+(B)+(C)+(D)+(E)+(F) of the thermoplastic resin. In some embodiments, the thermoplastic resin composition may include the inorganic filler in an amount of about 0.1, 0.2, 0.3, 0.4, 0.5, 0.6, 0.7, 0.8, 0.9, 1, 2, or 3 wt %. Further, according to some embodiments, the amount of the inorganic filler may be in a range from about any of the foregoing amounts to about any other of the foregoing amounts.

When the thermoplastic resin composition includes the inorganic filler in an amount within the above range, the thermoplastic resin composition may have excellent impact resistance and/or strength.

(F) Boehmite

The thermoplastic resin composition includes (F) boehmite.

The boehmite is included in an appropriate ratio with the phosphorus-based flame retardant, that is the bohemite and the phosphorus-based flame retardant are included at a weight ratio of 1:14 to 1:15, so that it may improve the flame retardancy without juicing phenomenon of the thermoplastic resin composition and also remarkably improve the heat resistance and the impact resistance.

For example, when the phosphorus-based flame retardant is included in an amount less than about 1400 parts by weight based on about 100 parts by weight of the boehmite, the heat resistance and the impact resistance can be excellent, but the flame retardancy can be deteriorated; and when the phosphorus-based flame retardant is included in an amount greater than about 1500 parts by weight based on about 100 parts by weight of the boehmite, the flame retardancy can be excellent, but the heat resistance and the impact resistance can be unfavorably deteriorated.

The thermoplastic resin composition may include the boehmite in an amount of about 0.1 wt % to about 2 wt % based on the total weight (100 wt %) of (A)+(B)+(C)+(D)+(E)+(F) of the thermoplastic resin. In some embodiments, the thermoplastic resin composition may include the boehmite in an amount of about 0.1, 0.2, 0.3, 0.4, 0.5, 0.6, 0.7, 0.8, 0.9, 1, or 2 wt %. Further, according to some embodiments, the amount of the boehmite may be in a range from about any of the foregoing amounts to about any other of the foregoing amounts.

When the boehmite is included in an amount within the above range, the flame retardancy, heat resistance and/or impact resistance of the thermoplastic resin composition may be all excellent.

(G) Other Additives

In addition, the thermoplastic resin composition may further include at least one additive as needed. Examples of additives include without limitation release agents, lubricants, plasticizers, heat stabilizers, light stabilizers, pigments, and/or dyes. The additive may be included in an amount of about 0.1 parts by weight to about 10 parts by weight based on about 100 parts by weight of the thermoplastic resin composition.

The thermoplastic resin composition according to present invention may have a form of pellet obtained by mixing the components and melt-extruding the same using a generally-used twin-screw extruder at about 200° C. to about 280° C., for example, about 210° C. to about 250° C.

The pellet may be fabricated into various articles by a forming method such as injection molding, extrusion molding, vacuum forming, casting, and the like. The forming method is well known to a person skilled in the art relating to the present invention.

The thermoplastic resin composition may have an Izod impact strength of about 8 kgf·cm/cm to about 15 kgf·cm/cm, for example, about 8 kgf·cm/cm to about 10 kgf·cm/cm, as measured on a ⅛"-thick specimen according to ASTM D256.

The thermoplastic resin composition may have a Vicat softening temperature (VST) of about 93° C. to about 110° C., for example, about 93° C. to about 100° C., as measured under a load of 5 kgf according to ISO R306.

In addition, the thermoplastic resin composition may have a flame retardancy of 5VB when evaluated using a 1.5 mm-thick specimen according to UL-94 regulation.

The thermoplastic resin composition may be usefully employed as a material for an electronic part although not limited thereto.

Hereinafter, the present invention is illustrated in more detail with reference to examples and comparative examples. However, the following examples and comparative examples are provided for the purpose of illustration only and the present invention is not limited thereto.

EXAMPLES

The specifications of (A) polycarbonate resin, (B) impact-reinforcing agent, (C) anti-drip agent, (D) phosphorus-based flame retardant, (E) inorganic filler, and (F) boehmite used in Examples and Comparative Examples are as follows:

(A) Polycarbonate Resin

Bisphenol-A type polycarbonate (SC-1190, Lotte Advanced Materials Co., Ltd.) having a weight average molecular weight (Mw) of 25,000 g/mol is used.

(B) Impact-reinforcing Agent

A graft copolymer in which a methacrylic acid methyl ester monomer is graft polymerized onto a butadiene rubber (an EXL-2602 resin manufactured by Kureha) is used.

(C) Anti-drip Agent

Teflon (trade name) 7AJ (DuPont USA) is used.

(D) Phosphorus-based Flame Retardant

Bisphenol-A diphosphate (manufactured by Yoke Chemical Co., Ltd, Product name: BDP) is used.

(E) Inorganic Filler
Talc (KC6300C, manufactured by Koch) is used.
(F) Boehmite
AOH60 (manufactured by Nabaltec) is used.

Examples 1 and 2, and Comparative Examples 1 to 6

Each of the components is added in an amount shown in the following Table 1 and extruded at 230° C. to provide a pellet. A twin-screw extruder having L/D=36, a diameter 45 mm is used for the extrusion, and the obtained pellet is dried at 80 to 100° C. for greater than or equal to 4 hours and injected at 230° C. (LGH 140N) to provide a specimen. The obtained specimen is measured for properties thereof in accordance with the following methods, and the results are shown in the following Table 2.

Methods of Measuring Properties (1) IZOD impact strength (unit: kgf·cm/cm): 1/8" Izod specimen is formed with a notch and evaluated according to an evaluation method set in ASTM D256.

(2) Evaluation of heat resistance (unit: ° C.): Vicat softening temperature (VST) is measured under a load of 5kgf according to ISO R306.

(3) Evaluation of flame retardancy: a specimen having a thickness of 1.5 mm is prepared and measured according to a procedure of Underwriter's Laboratory Bulletin 94 which is referred to as "UL 94".

TABLE 1

(unit: wt %)

|  | Ex. 1 | Ex. 2 | Comp. Example 1 | Comp. Example 2 | Comp. Example 3 | Comp. Example 4 | Comp. Example 5 | Comp. Example 6 |
|---|---|---|---|---|---|---|---|---|
| (A) Polycarbonate resin | 69 | 70 | 70 | 70 | 69 | 70 | 68 | 71 |
| (B) Impact-reinforcing agent | 13 | 13 | 13 | 13 | 13 | 13 | 13 | 13 |
| (C) Anti-drip agent | 1 | 1 | 1 | 1 | 1 | 1 | 1 | 1 |
| (D) Phosphorus-based flame retardant | 15 | 14 | 16 | 15 | 15 | 14 | 16 | 13 |
| (E) Inorganic filler | 1 | 1 | — | 1 | 2 | 2 | 1 | 1 |
| (F) Boehmite | 1 | 1 | — | — | — | — | 1 | 1 |

TABLE 2

|  | Ex. 1 | Ex. 2 | Comp. Example 1 | Comp. Example 2 | Comp. Example 3 | Comp. Example 4 | Comp. Example 5 | Comp. Example 6 |
|---|---|---|---|---|---|---|---|---|
| Heat resistance (° C.) | 95 | 96 | 93 | 95 | 95 | 96 | 93 | 97 |
| IZOD impact strength (kgf · cm/cm) | 8 | 10 | 10 | 8 | 6.5 | 7 | 6 | 10 |
| Flame retardancy | 5VB | 5VB | Fail | Fail | 5VB | Fail | 5VB | Fail |

From Tables 1 and 2, it is confirmed that the thermoplastic resin compositions according to Examples 1 and 2 have excellent flame retardancy and simultaneously, excellent heat resistance and impact resistance compared to the thermoplastic resin compositions obtained from Comparative Examples 1 to 6.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   (A) a polycarbonate resin;
   (B) an impact-reinforcing agent;
   (C) an anti-drip agent;
   (D) a phosphorus-based flame retardant;
   (E) an inorganic filler; and
   (F) boehmite,
   wherein the phosphorus-based flame retardant and the boehmite are included in a weight ratio of about 14:1 to about 15:1.

2. The thermoplastic resin composition of claim 1, wherein the polycarbonate resin has a weight average molecular weight of about 10,000 g/mol to about 200,000 g/mol.

3. The thermoplastic resin composition of claim 1, wherein the impact-reinforcing agent includes a rubber modified vinyl-based copolymer.

4. The thermoplastic resin composition of claim 3, wherein the rubber modified vinyl-based copolymer includes an ethylene-methylacrylate copolymer (EMA), an ethylene-ethyl acrylate copolymer (EEA), methylmethacrylate-butadiene-styrene (MBS), styrene-butadiene-styrene (SBS), a styrene-butadiene rubber (SBR), an ethylene-propylene rubber (EPM, EPR), an ethylene-propylene-diene copolymer (EPDM), a maleic anhydride modified EPM (EPM-g-MA), maleic anhydride modified SBS (SBS-g-MA), maleic anhydride modified EPDM (EPDM-g-MA), and/or an ethylene vinyl alcohol copolymer (EVOH).

5. The thermoplastic resin composition of claim 1, wherein the anti-drip agent includes a fluorinated olefin-based resin.

6. The thermoplastic resin composition of claim 1, wherein the phosphorus-based flame retardant is represented by Chemical Formula 1:

[Chemical Formula 1]

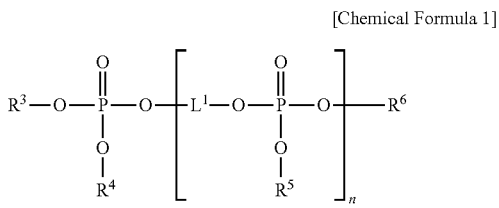

wherein, in Chemical Formula 1,

R³ to R⁶ are the same or different and are each independently a substituted or unsubstituted C1 to C20 alkyl group or a substituted or unsubstituted C6 to C20 aryl group, each $L^1$ is independently a substituted or unsubstituted C1 to C20 alkylene group or a substituted or unsubstituted C6 to C20 arylene group, and n is an integer ranging from 0 to 3.

7. The thermoplastic resin composition of claim 6, wherein R³ to R⁶ are each independently an unsubstituted phenyl group and/or a phenyl group substituted with a methyl group, an ethyl group, an isopropyl group, a t-butyl group, an isobutyl group, an isoamyl group, and/or a t-amyl group.

8. The thermoplastic resin composition of claim 1, wherein the inorganic filler is a sheet-shaped filler.

9. The thermoplastic resin composition of claim 8, wherein the sheet-shaped filler is talc, mica, or a mixture thereof.

10. The thermoplastic resin composition of claim 8, wherein the sheet-shaped filler has an average thickness of about 30 nm to about 700 nm, an average particle size of about 0.65 μm to about 5.0 μm, and a ratio (diameter/thickness) of an average diameter and an average thickness of about 4 to about 30.

11. The thermoplastic resin composition of claim 1, wherein the thermoplastic resin composition includes:
    about 50 wt % to about 80 wt % of (A) the polycarbonate resin;
    about 10 wt % to about 15 wt % of (B) the impact-reinforcing agent;
    about 0.1 wt % to about 3 wt % of (C) the anti-drip agent;
    about 1.4 wt % to about 30 wt % of (D) the phosphorus-based flame retardant;
    about 0.1 wt % to about 3 wt % of (E) the inorganic filler; and
    about 0.1 wt % to about 2 wt % of (F) the boehmite,
    each based on a total amount of (A)+(B)+(C)+(D)+(E)+(F) of the thermoplastic resin composition.

12. The thermoplastic resin composition of claim 1, wherein the thermoplastic resin composition further includes at least one of a release agent, a lubricant, a plasticizer, a heat stabilizer, a light stabilizer, a pigment, and a dye.

13. An article formed from the thermoplastic resin composition of claim 1.

* * * * *